Patented Mar. 20, 1934

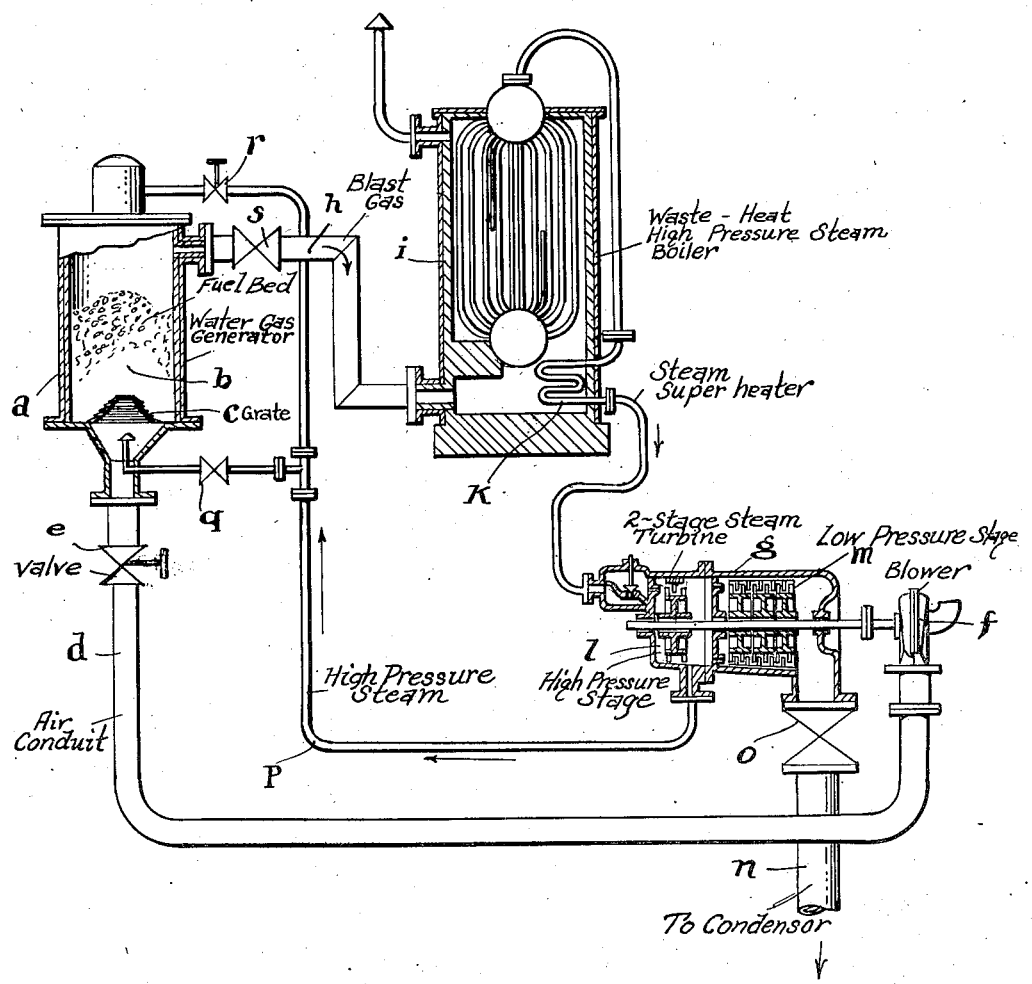

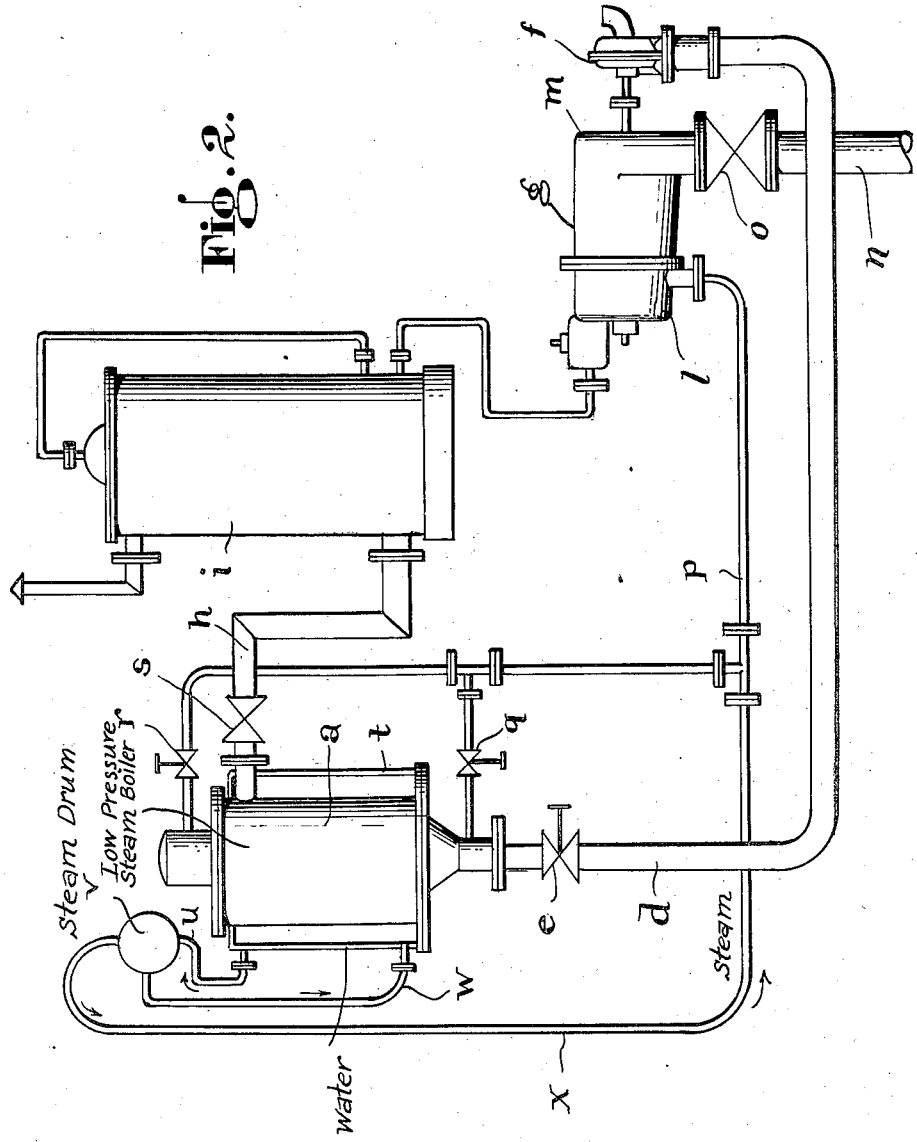

1,951,990

UNITED STATES PATENT OFFICE 1,951,990

WATER-GAS GENERATOR

Adolf Noack, Berlin-Reinickendorf-Ost, Germany, assignor to Julius Pintsch Aktiengesellschaft, Berlin, Germany Application September 6, 1930, Serial No. 480,218
In Germany September 11, 1929

3 Claims. (Cl. 48—78)

It is known in water-gas generating plants in which a solid fuel bed is intermittently blown to incandenscence and steam is introduced into the generator containing the fuel bed thus forming water-gas to provide a waste heat boiler and to use the steam generated therein for operating a steam turbine which drives a blower. In water-gas plants as hitherto known this turbine is constructed as a back-pressure turbine and delivers part of its low pressure steam to a storage plant, from which it is during the gassing period delivered to the water-gas generator for the production of water-gas.

It is further known to provide water-gas producers with a steam jacket for the production of steam of a higher or lower pressure. This steam also is mostly employed, with the interposition of a storage plant, for operating the water-gas plant.

According to the present invention such a waste heat boiler in which during the blow-run of the water-gas generator high-pressure steam is generated by utilizing the heat of the combustion gases leaving the water-gas generator, a two-stage steam turbine which drives the blower delivering air to the water-gas generator during the blow-run and the water-gas generator itself are combined with each other in such a way that during the blow-run, when no steam is wanted for the production of water-gas but much energy is wanted for driving the blower, the steam passes the high-pressure stage as well as the low-pressure stage of the turbine and then is exhausted or condensed. Whereas, during the steam run of the water-gas generator, when low-pressure steam is wanted for producing water-gas but little energy is wanted for keeping the blower running, the latter delivering no air, the high-pressure steam only passes the high-pressure stage of the turbine and the low-pressure steam leaving the high-pressure stage is supplied to the generator for the production of water-gas.

If a water-jacket low pressure steam generator is provided, the steam generated therein may during the blow-run of the water-gas generator be supplied to the low-pressure stage of the turbine and be used for generating energy, whereas during the steam-run of the water-gas generator this steam is supplied together with the low-pressure steam leaving the high-pressure stage of the turbine to the water-gas generator for the production of water-gas.

The advantage of the arrangement according to the invention resides in the possibility of dispensing with a steam storage vessel with its associated steam-pipes and foundations. Furthermore the total steam consumption of the water-gas plant is reduced by about one quarter or more, as no low-pressure steam is exhausted without being utilized to the utmost for the production of energy. As the two stages of the steam turbine, when supplied with steam, always run at full capacity the production of energy is effected with the biggest efficiency, whereas in the arrangement hitherto known using a single stage turbine this is running at full capacity only during the blow-run, a bad efficiency being obtained, therefore, during the blow-run.

In the accompanying drawings:

Fig. 1 is a diagrammatical view of a water-gas plant according to this invention with a water-gas generator without water-jacket while Fig. 2 shows a plant with a water-gas generator provided with a water-jacket steam generator.

The same reference numerals are used in both figures. Referring to Figure 1, $a$ is a water-gas generator with the solid fuel bed $b$ in it which during the blow-run is blown to incandenscence by means of air introduced below the grate $c$ through the pipe $d$, the slide valve $e$ being open. The air is delivered by the blower $f$ which is driven by means of the two-stage steam turbine $g$. The blast-gases leave the generator at the top and are supplied by means of pipe $h$ to the waste-heat high-pressure steam generator $i$. The steam generated therein which may be superheated in the superheater $k$ is supplied to the high-pressure stage $l$ of the turbine and after leaving this stage passes also the low-pressure stage $m$. From there it is exhausted or led to a condenser through pipe $n$, valve $o$ being open. During the steam run of the water-gas generator valve $o$ is closed and the steam leaving the high-pressure stage $l$ cannot pass the low-pressure stage but is taken off and led through piping $p$ to the water-gas generator, either to the bottom, valve $q$ being open or to the top, valve $r$ being open. During the steam run of the water-gas generator, the slide valve $s$ in the off-take pipe for the blast-gases is closed, the generated water-gas leaving the generator through another pipe, not shown in the drawings.

The water-gas generator $a$ shown in Figure 2 is provided with a water-jacket low-pressure steam generator $t$. By means of pipe $u$ the steam generated therein is brought to a steam drum $v$ while the water entrained with this steam is brought back to the water-jacket through pipe $w$. The steam drum $v$ is connected by means of pipe $x$ to pipe $p$, so that the steam generated in the water-jacket is during the blow-run led to the low-pressure stage m of the turbine g which it passes together with the steam leaving the high-pressure stage l of the turbine g, thus being used for the production of energy necessary for driving the blower f. During the steam run of the water-gas generator however, this steam, together with the steam leaving the high-pressure stage l, is led to the fuel bed b of the water-gas generator a, one of the valves q or r being open, thus being used for generating water-gas.

What I claim is:

1. An intermittently working water-gas plant comprising a generator adapted to contain a bed of solid fuel, a blower supplying the air blast to said generator, a multistage steam turbine for driving said blower, a waste heat high pressure steam boiler connected to said generator, a conduit connecting said boiler and said turbine, a valved conduit connecting the exhaust side of the first stage of said turbine with said generator, whereby exhaust steam is supplied to said generator during the steam run, and cut off from said generator during the air blast period.

2. An intermittently working water-gas plant comprising a generator adapted to contain a bed of solid fuel, a blower supplying the air blast to said generator, a multistage steam turbine for driving said blower, a waste heat high pressure steam boiler connected to said generator, a conduit connecting said boiler and said turbine, a valved conduit connecting the exhaust side of the first stage of said turbine with said generator, whereby exhaust steam is supplied to said generator during the steam run, and cut off from said generator during the air blast period; a jacket surrounding said generator, a low pressure steam boiler constituting, a steam drum, a conduit connecting said drum and jacket, a return water conduit between said drum and jacket and a conduit from said drum opening into the conduit between the turbine and the generator.

3. Intermittently working water-gas plant, comprising a generator adapted to contain a bed of solid fuel, a water-jacket low-pressure steam boiler, a low-pressure steam drum, a conduit connecting said water-jacket to said steam drum for supplying the low-pressure steam to the drum, a blower supplying the air blast to said generator, a multi-stage steam turbine for driving said blower, a waste-heat high-pressure steam boiler connected to said generator, a conduit connecting said boiler and said turbine, valved conduits connecting the exhaust side of the first stage of the turbine and the steam drum respectively to said generator, whereby exhaust steam is supplied to the generator during the steam run and cut off from said generator during the air-blast period, a valved conduit connecting said steam drum to the first stage of the turbine and the generator respectively.

ADOLF NOACK.